No. 726,329. PATENTED APR. 28, 1903.
H. W. MORGAN.
MACHINE FOR MAKING SHOOKS FOR BOXES.
APPLICATION FILED MAY 5, 1900.
NO MODEL. 5 SHEETS—SHEET 1.
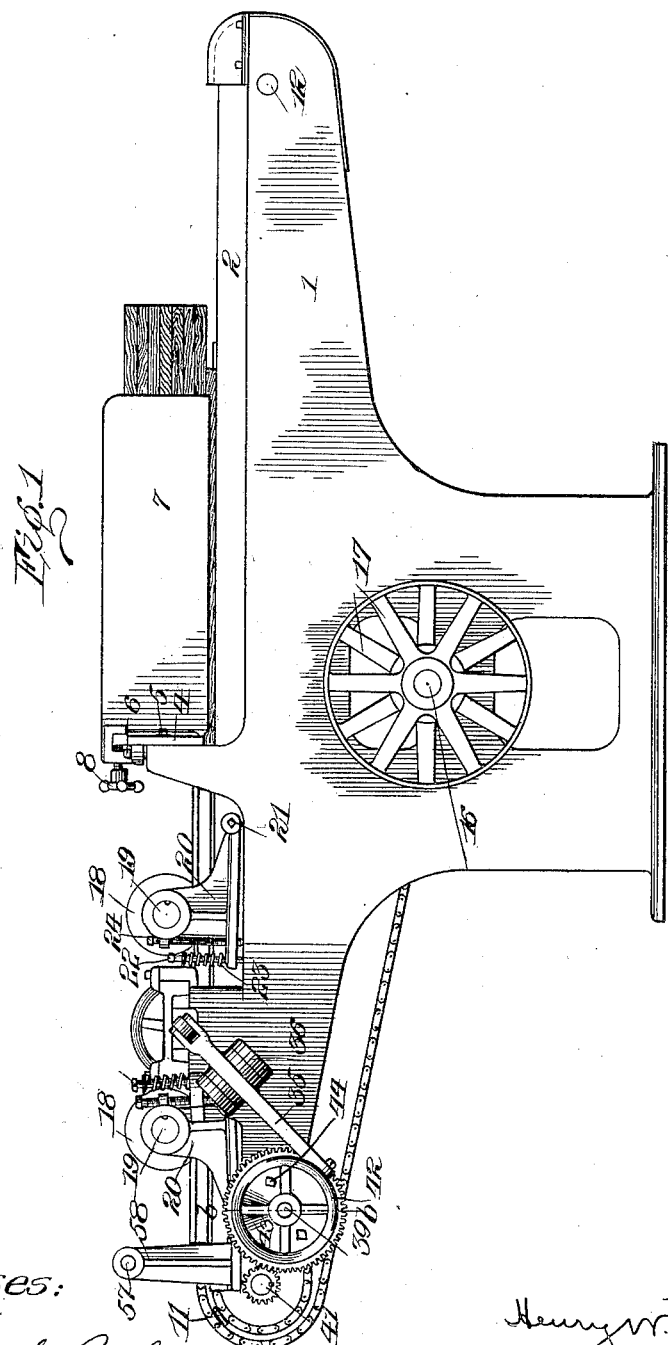

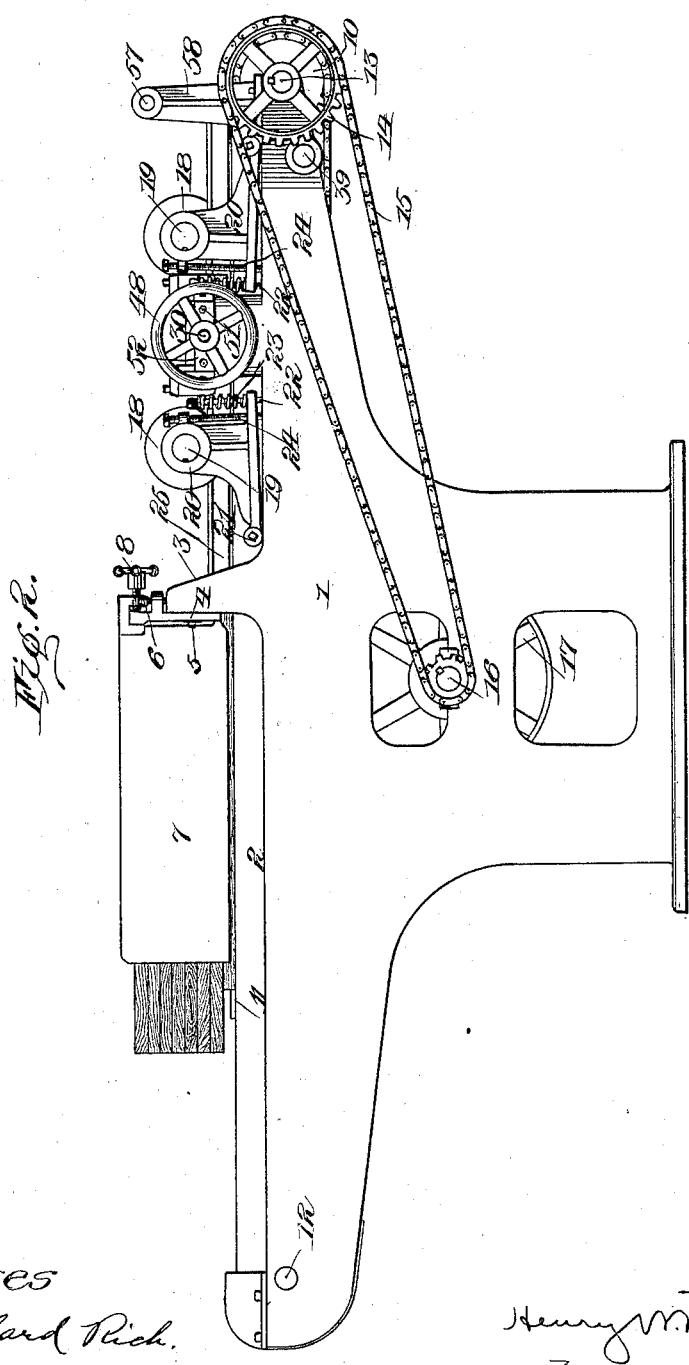

No. 726,329. PATENTED APR. 28, 1903.
H. W. MORGAN.
MACHINE FOR MAKING SHOOKS FOR BOXES.
APPLICATION FILED MAY 5, 1900.
NO MODEL. 5 SHEETS—SHEET 3.
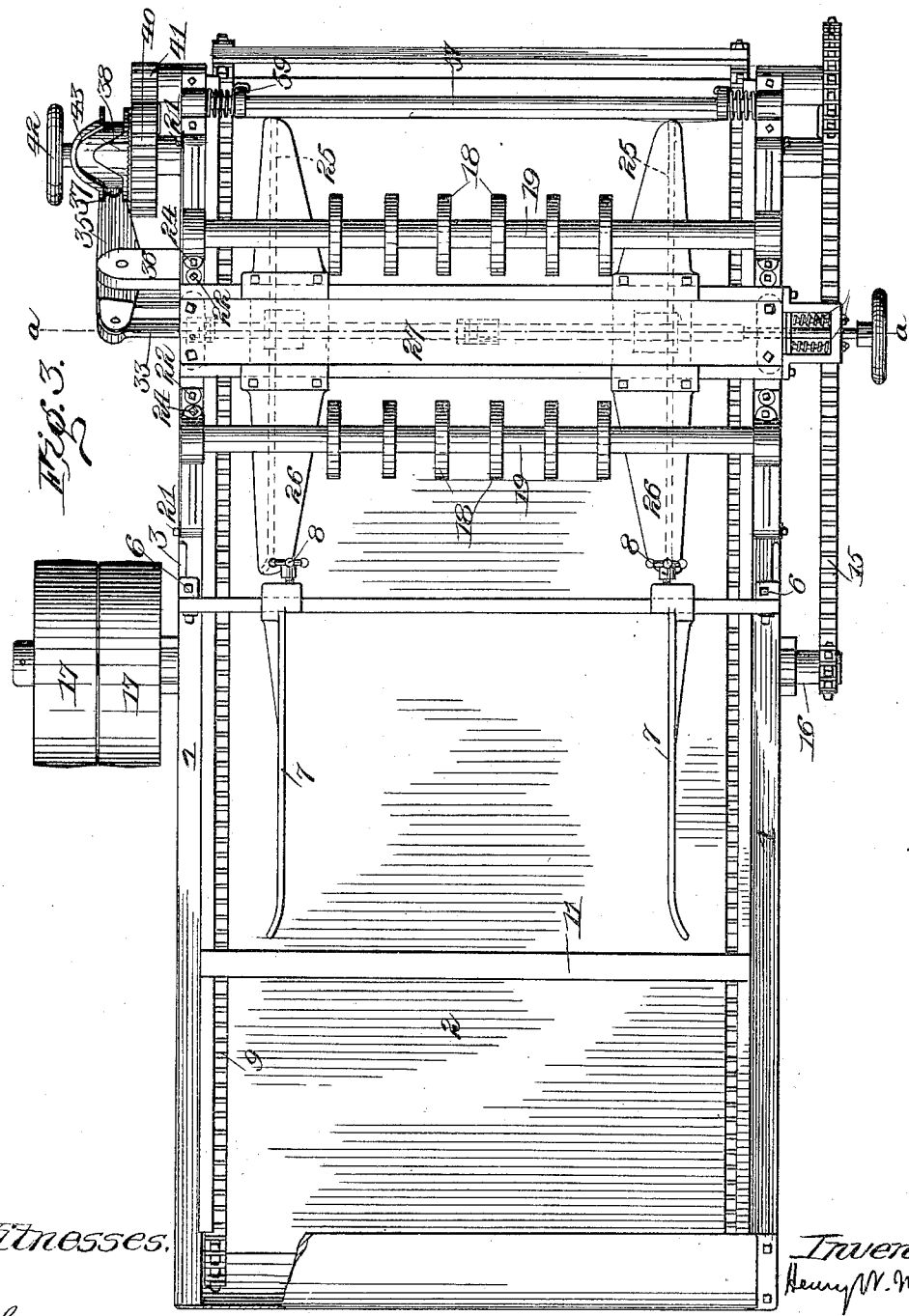
Witnesses. Inventor
Henry W. Morgan
by Church & Church
his Attorneys

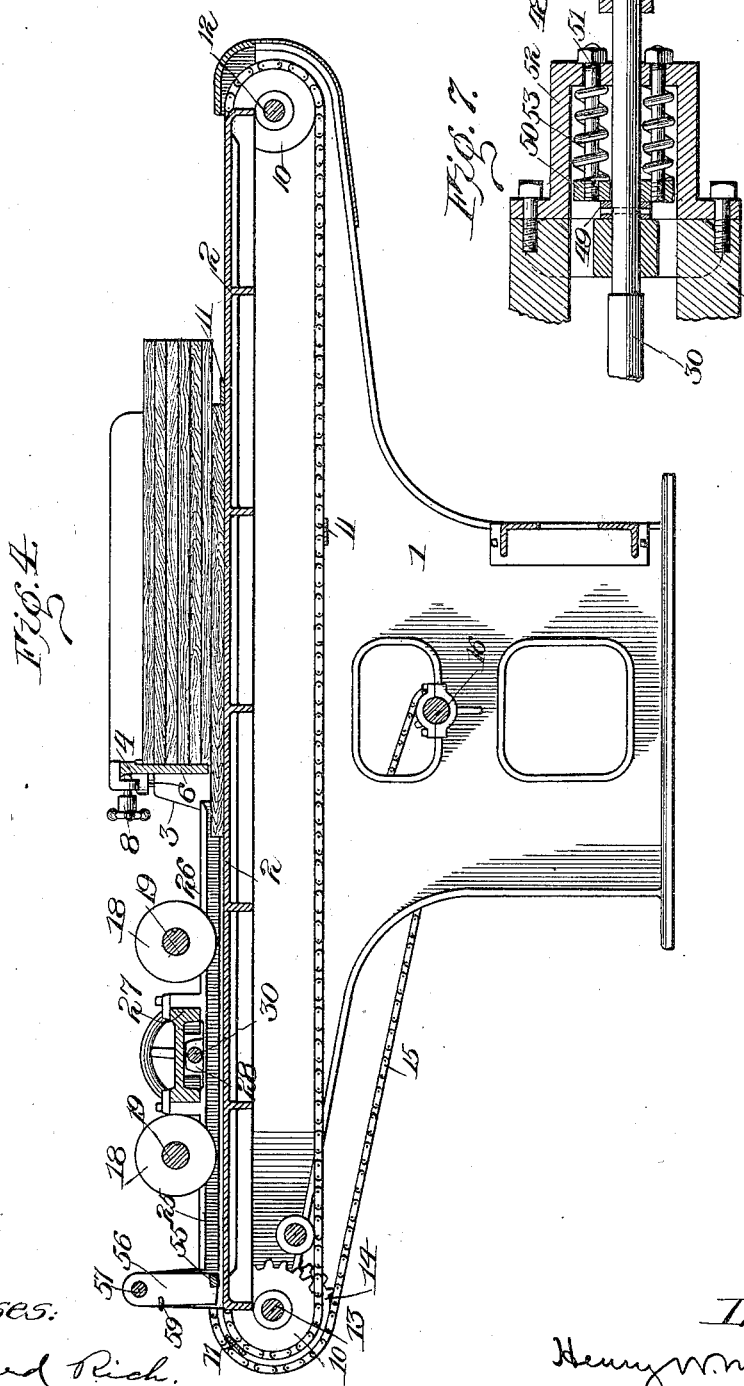

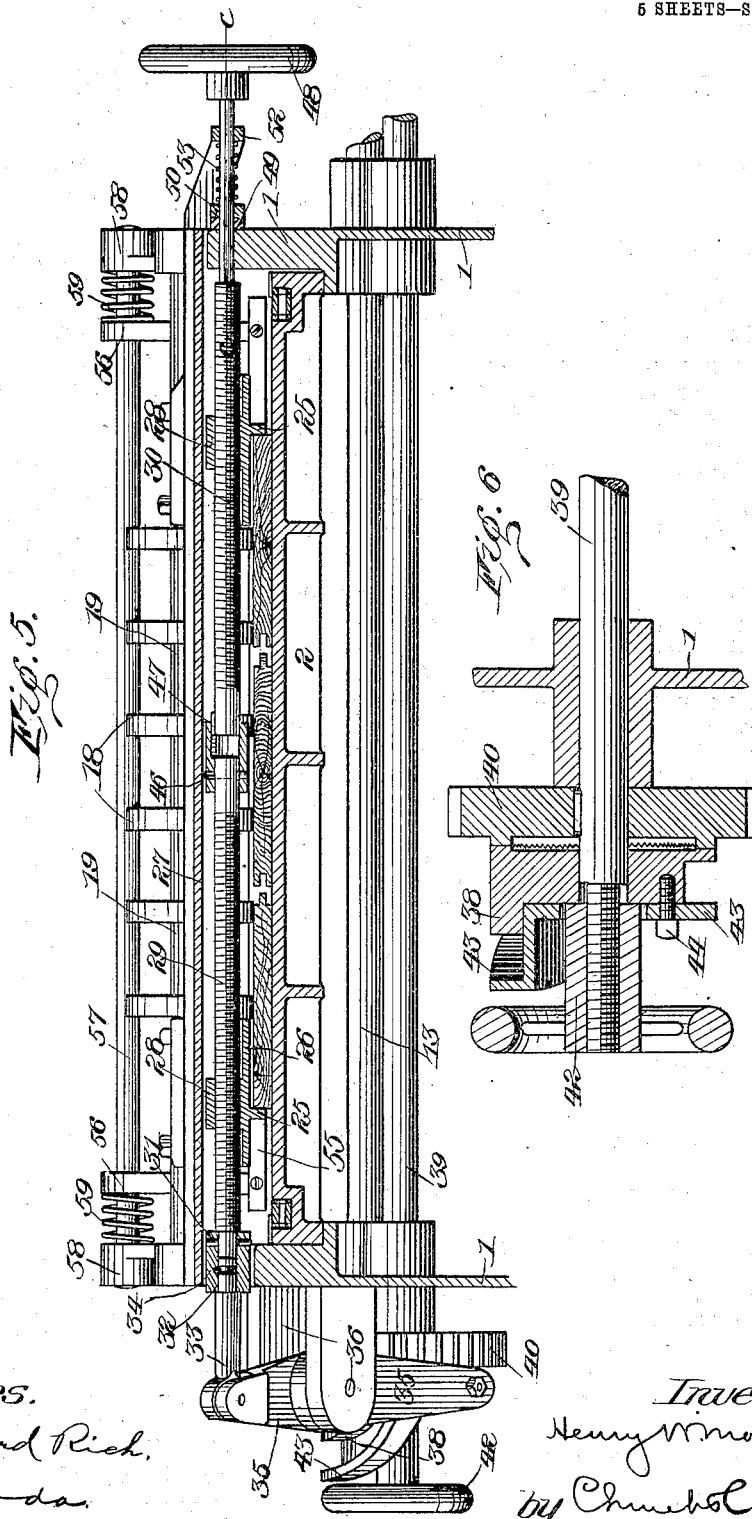

UNITED STATES PATENT OFFICE.

HENRY W. MORGAN, OF ROCHESTER, NEW YORK.

MACHINE FOR MAKING SHOOKS FOR BOXES.

SPECIFICATION forming part of Letters Patent No. 726,329, dated April 28, 1903.

Application filed May 5, 1900. Serial No. 15,611. (No model.)

*To all whom it may concern:*

Be it known that I, HENRY W. MORGAN, of Rochester, in the county of Monroe and State of New York, have invented certain new and useful Improvements in Machines for Making Shooks for Boxes; and I do hereby declare the following to be a full, clear, and exact description of the same, reference being had to the accompanying drawings, forming a part of this specification, and to the reference-numerals marked thereon.

My present invention has for its object to assemble and fit together a series of matched boards or pieces forming the sides or bottoms of boxes and termed in the trade "shooks;" and the invention consists in certain improved constructions and combinations of parts whereby the appropriate boards being placed in the machine are automatically fed and pressed together with their interlocking tongues and grooves in engagement in such condition that the shooks may be taken directly to the nailing-machine and formed into boxes, all as will be hereinafter fully described, the novel features being pointed out in the claims at the end of this specification.

In the drawings, Figure 1 is a side elevation of a machine constructed in accordance with my invention; Fig. 2, a similar view of the opposite side; Fig. 3, a plan view of the machine; Fig. 4, a longitudinal sectional view; Fig. 5, a cross-sectional view taken on the line *a a* of Fig. 3; Fig. 6, a sectional view taken on the line *b b* of Fig. 1; Fig. 7, a horizontal sectional view taken on the line *c c* of Fig. 5.

Similar reference-numerals indicate similar parts.

The main frame of the machine may be of any suitable construction, but in the present instance consists of the side frames 1 1, connected by suitable cross-braces and also near the top by the bed, table, or work-support 2. The sides 1 of the machine are provided with the extensions 3 at the top, to which is adjustably secured a board or fence 4, extending across the work-support and secured by the bolts 5 and supported upon adjustable bolts 6, by which said fence may be elevated to increase the distance between its lower side and the bed 2, whereby boards of different thickness may be accommodated. Secured to the fence 4 are the side plates or wings 7, adjustably secured by hand-screws 8. The fence 4 and side plates 7 constitute a receptacle whose bottom is formed by the support 2 and which is open at its forward end a space equal to the distance that the fence 4 is raised above the said bed, so that the boards from which the shook is made may be placed therein with their tongue-and-grooved edges in juxtaposition and the lower set or row constituting one shook may be fed from this box or container to the pressing devices. In the present instance the conveying devices for carrying the lowermost row of boards forward over the support 2 consist of suitable chains 9, extending over sprockets 10 at the ends of the support and carrying at suitable intervals cross-bars or lags 11, which pass under the fence 4, as usual in machines of this description. The sprockets 10 at the feed end of the machine may be secured to or loosely mounted upon a shaft 12, and those at the forward end of the machine are rigidly secured to a shaft 13, having thereon a sprocket 14, driven by a chain 15 from the main driving-shaft 16, on which the belt-pulleys 17 are mounted. Over the work-support or bed 2 and in rear of the fence 4 are arranged pressing or holding wheels 18, mounted upon shafts 19 and adapted to hold down the boards while their matched edges are being pressed together. These shafts 19 are journaled at their ends in boxes 20, pivoted at 21 to the side frame, having their ends perforated for the passage of an adjustable bolt 22, secured to the side frame, and between the head of which and the side frame are arranged springs 23 to permit the presser-rollers to yield slightly vertically. Adjusting-screws 24, screwing in the brackets 20 and engaging the side frames, limit the downward movement of said brackets. The clamping or squeezing devices for forcing the matched edges of the boards into engagement embody generally two jaws or plates 25, positively moved relatively toward each other to squeeze them tightly into engagement. The plates or jaws 25 are provided, preferably, with the horizontal extensions or flanges 26, extending over the end boards to hold the latter downward upon the bed, as shown particularly in Fig. 5. The pressers are gibbed to and slide upon a suitable cross bar or frame 27, secured to the side frames of the machine, and are provided with upwardly-extended threaded lugs 28 for engaging the right and left screw-threaded rods 29 and 30, the former being connected by a pin 31 with a collar or coupling 32, to which collar is connected a rod or pitman 33 by means of a pin or pins 34, secured in the collar and operating in the groove in the end of the pitman 33, so that while the screw will be reciprocated by the movement of said pitman it may be turned to adjust the presser 25 independently thereof. The outer end of the pitman is connected to the lever pivoted at 36 to a bracket on the side frame and having at its other end a stud or roller 37, arranged to coöperate with a cam 38, adjustably secured to a shaft 39, mounted in bearings in the main frame and having a gear 40 thereon meshing with a pinion 41 on the shaft 13. The adjustment of the cam relatively to the gear 40, which is splined to the shaft, is effected by providing serrations on the proximate faces of the cam and gear and locking the cam in adjusted position by a hand-nut 42 on the threaded end of the shaft 39, as shown in Fig. 6, and the cam is preferably provided with a guard-plate 43, removably secured to the cam by means of a bolt 44, Fig. 6. The threaded rods 29 and 30 are coupled or connected at their inner proximate ends, so as to be capable of simultaneous rotation and also to permit an independent longitudinal movement, this coupling consisting in the present instance of a sleeve 45, to which one of the rods—say 29—is secured by a pin 46, while the other rod 30 is provided with a spline 47, engaging a corresponding groove in the interior of the coupling-sleeve. The outer end of the rod 30 is provided with a hand-wheel 48 and also with a collar or ring 49, having its inner side abutting against the bearing-frame for the rod and engaging at its outer side a plate 50, encircling the rod and provided with adjustable bolts 51, extending through the outer side of a yoke or frame 52, bolted to the side frame of the machine, and between the inner side of the yoke-frame and the plate 50 are arranged springs 53, (see Fig. 7,) this construction permitting the presser-plate connected to the rod 30 to move outwardly independently against the tension of the springs 53, and the coupling between the rods 29 and 30 permits them to be rotated together to adjust the presser-plates 25 toward and from each other, as will be understood.

Just beyond the pressing devices and in the present instance at the extreme end of the machine is arranged a yielding stop for engaging the ends of the boards and holding them in alinement during the pressing operation, said stop being adapted to yield when the boards are forced through and permitting them to pass. In the present arrangement this yielding stop or alining device consists of a cross-bar 55, secured to the lower end of links 56, suspended upon a shaft 57 in bracket 58 at the side of the machine, said bar being swung toward the pressing devices by springs 59, encircling the shaft and engaging the frame and arms.

The general operation of the machine will now be readily understood.

The matched boards being placed upon the support 2 between the side plates 7 and arranged with their matched edges in juxtaposition, the machine is started, and the conveying devices will move the lower boards from the pile and beneath the fence between the pressing jaws or plates 25, said boards being yieldingly held down upon the support, and when their forward ends have engaged and been alined by the yielding stop the abrupt portion of the cam will turn the lever and force inwardly the presser-plate connected thereto toward the opposite presser plate or jaw, causing the matched edges of the boards to be firmly engaged, the springs 53 regulating the pressure exerted and preventing breakage of the parts. As soon as the jaws have completed their relative approach they are moved outward again by the cam and the completed shook fed forward by the continued movement of the lags 11, the alining-stop yielding and permitting their passage out of the machine. By means of the adjusting devices described the machine can readily be adapted for shooks of different widths, the clamping plates or jaws being adjustable toward and from the center of the bed-plate or work-support. The fence can be vertically adjusted for different thicknesses of boards and the side plates 7 laterally adjusted for different widths of shooks. Instead of the feeding or conveying devices shown others could be employed.

I claim as my invention—

1. In a machine for uniting separate matched boards, the combination with a support and board-conveying devices, of board-clamping plates movable relatively laterally of the support and yielding pressing-rollers for holding the boards upon the support during the clamping operation.

2. In a machine for uniting separate matched boards, the combination with a support and board-conveying devices operating over it, of a clamping device operating laterally of the support embodying a movable plate, a cam for operating it toward the center of the support, and a coöperating opposing plate, and means for simultaneously adjusting said plates relatively.

3. In a machine for uniting separate matched boards, the combination with a support and board-conveying devices operating over it, of the clamping-plates arranged at opposite sides of the support, connecting devices for simultaneously adjusting them toward and from each other, and means for operating one of said jaws toward the other to clamp the boards between them.

4. The combination with the support, board-conveying devices operating over it, and a pair of clamping-plates movable relatively laterally of the support, of yielding board-pressers, and a movable alining-stop for the boards beyond the clamping device in the direction of movement of the boards.

5. The combination with the support, board-conveying devices, a pair of clamping-plates movable relatively laterally of the direction of movement of the conveying devices, of yielding board-pressers, and a yielding alining-stop for the boards beyond the clamping device in the direction of movement of the boards.

6. The combination with the support, board-conveying devices operating over it, a pair of clamping-plates movable laterally of the direction of movement of the conveying devices, of board-pressers operating on the boards between the clamping-plates, and the yielding swinging alining-bar for engaging the ends of the boards beyond the clamping device.

7. The combination with the support, board-clamping devices arranged at opposite sides thereof, embodying the clamping-plates, the threaded rods engaging them and having a sliding connection with each other, and means for positively operating said plates relatively toward and from each other.

8. The combination with the support, of the clamping-plates, the screws connected thereto and having a longitudinally-adjustable connection with each other, means for positively operating one plate toward and from the other, and a yielding backing for the other coöperating plate.

9. The combination with the support, of the clamping-plates, the screws coöperating with each and connected for simultaneous rotation, a longitudinally-adjustable coupling between the screws, a positively-operated member, as a lever, and a swivel connection between said member and one of the screws.

10. The combination with the support, and the cross-bar extending over it, of the clamping-plates sliding on the bar, the adjusting-screws connected to the plates and connected to each other by an adjustable connection, a yielding backing for one of the plates, and a positively-operated member for actuating the other plate toward and from the first-mentioned one.

11. The combination with the support, the lag-chains for carrying boards longitudinally of the support, and driving-wheels for operating them, of the relatively movable clamping-plates operating laterally of the path of movement of the lag-chains, a cam for operating said plates, the shaft to which the cam is adjustably connected, and gearing between said shaft and the driving-wheels of the lag-chains whereby the clamping-plates are operated during the continuous movement of the lag-chains.

12. The combination with the support, the adjustable fence and side plates and board-conveying devices operating beneath the fence, of the clamping-plates movable laterally of the center of the support to clamp the boards between them, means for operating said plates, pressers for holding the boards down on the support during the pressing operation and means for simultaneously adjusting both of the clamping-plates toward and from each other and relative to the center of the support independently of their operating means.

13. The combination with the clamping-plates, the supporting-frame therefor, and the adjusting-screws for the plates coupled for simultaneous operation, of the operating member swiveled to one screw, the collar on the other screw, the yoke on the frame, and the spring interposed between said collar and yoke.

HENRY W. MORGAN.

Witnesses:
G. WILLARD RICH,
GRACE A. RODA.